April 20, 1954  H. R. PLUMMER  2,675,604
TOOLHOLDER
Filed Nov. 29, 1951  2 Sheets-Sheet 1
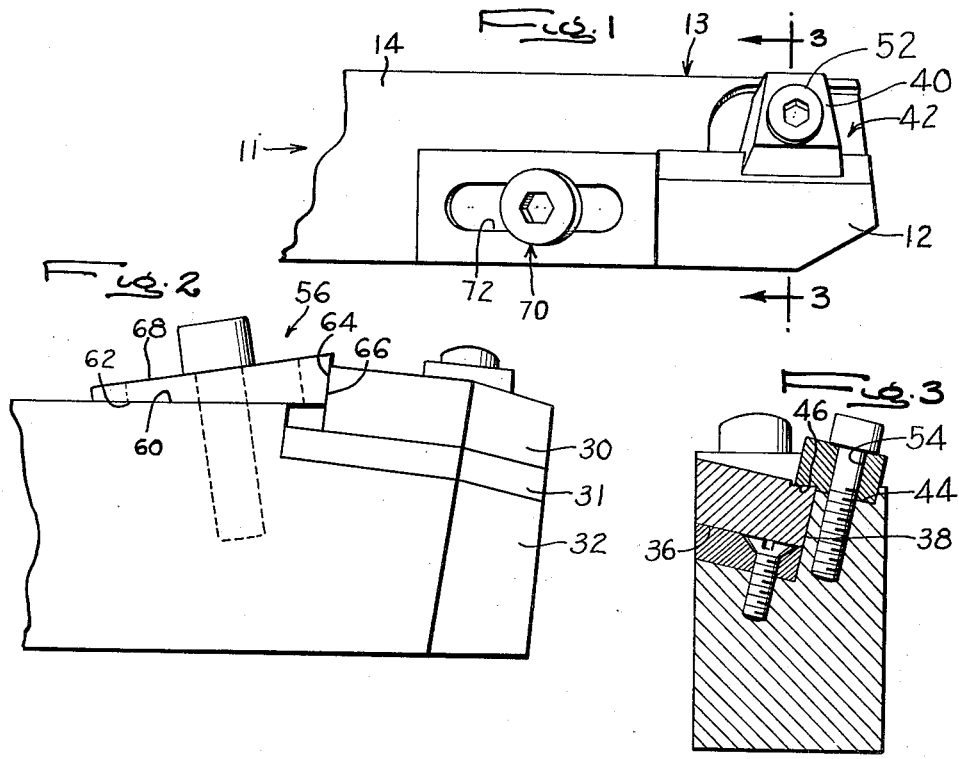
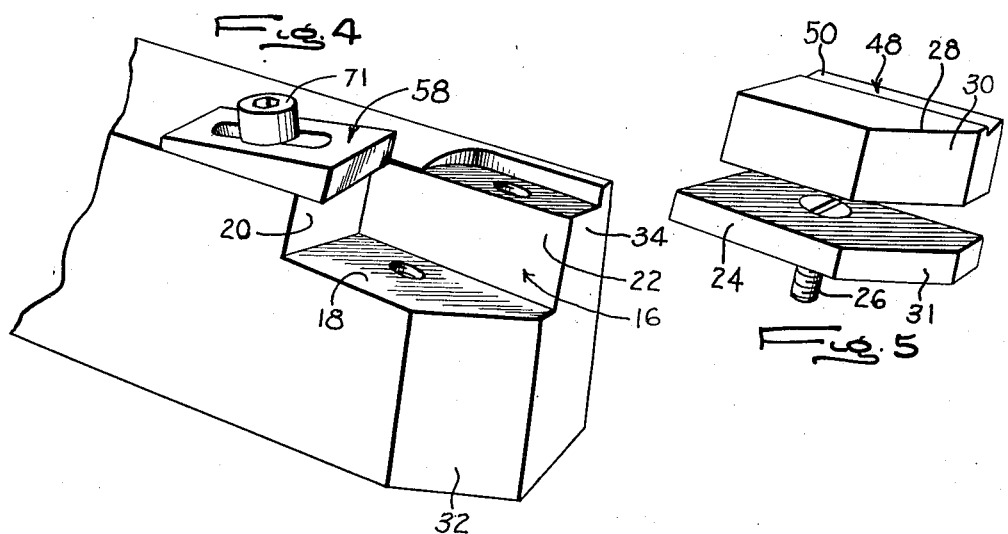
INVENTOR
Harvey R. Plummer
By Carlson, Pitzner, Hubbard & Wolfe
ATTORNEYS April 20, 1954  H. R. PLUMMER  2,675,604
TOOLHOLDER
Filed Nov. 29, 1951  2 Sheets-Sheet 2
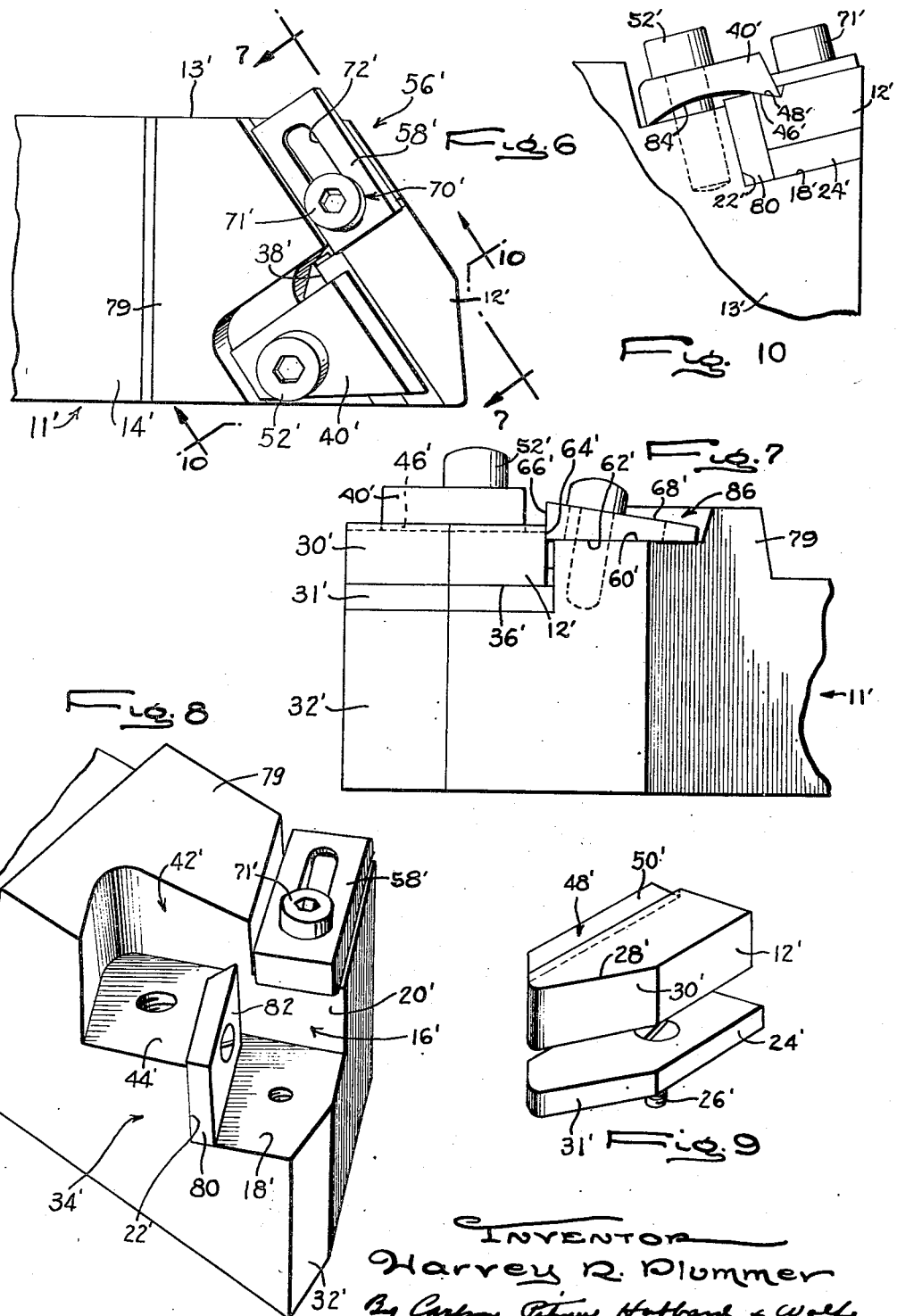

Patented Apr. 20, 1954

2,675,604

UNITED STATES PATENT OFFICE 2,675,604

TOOLHOLDER

Harvey R. Plummer, Fond du Lac, Wis., assignor to Giddings & Lewis Machine Tool Company, Fond du Lac, Wis., a corporation of Wisconsin Application November 29, 1951, Serial No. 258,925

5 Claims. (Cl. 29—96)

This invention relates to cutting tools and more particularly to tool holders for supporting tool bits made of tungsten carbide or other cutting materials.

It is an object of the invention to provide a tool holder having improved means for backing up a tool bit.

A further object is to provide a tool holder having tool backing means so constructed as to provide for accurate longitudinal adjustment of the tool bit.

A further object is to provide a tool holder having tool backing means which is easily adjustable and which nevertheless reliably maintains its adjustment during use.

A further object is to provide a tool holder having tool backing means in the form of a wedge member together with clamping means for adjustably positioning the wedge member.

A further object is to provide a tool bit holder having a wedge-shaped backing member which is adjustable angularly as well as longitudinally so that full bearing contact can be maintained between the backing member and the tool bit, even though the tool bit and the backing member are not exactly square.

A still further object is to provide an improved tool holder which is unusually inexpensive to manufacture.

Further objects and advantages of the invention will appear from the following detailed description taken with the accompanying drawings in which:

Figure 1 is a plan or top view of an illustrative tool constructed in accordance with the invention.

Fig. 2 is an elevational view of the tool taken longitudinally thereof.

Fig. 3 is a transverse sectional view taken along the line 3—3 of Fig. 1.

Fig. 4 is a perspective view of the tool with the tool bit, a tool bit clamp, and a shim removed to reveal certain constructional details of the tool holder.

Fig. 5 is a perspective view showing the tool bit and the shim detached from the tool holder.

Fig. 6 is a top or plan view of another embodiment of the invention.

Fig. 7 is an elevational view of the embodiment of Fig. 6 taken along the line 7—7 of Fig. 6 in a direction angularly related to the axis of the tool holder.

Fig. 8 is a perspective view of the embodiment of Fig. 6 with the tool bit, a hold-down clamp, and a shim removed to reveal certain constructional details of the tool holder.

Fig. 9 is a perspective view showing the tool bit and the shim detached from the embodiment of Fig. 6, and Fig. 10 is a sectional view, taken along the line 10—10 in Fig. 6.

While the invention is susceptible of various modifications and alternative constructions, there are shown in the drawings and will herein be described in detail the preferred embodiments, but it is to be understood that it is not thereby intended to limit the invention to the forms disclosed, but it is intended to cover all modifications and alternative constructions falling within the spirit and scope of the invention as expressed in the appended claims.

Figs. 1–5 of the drawings illustrate a tool holder 11 adapted to support a suitably shaped tool bit or tip 12, which may be made of a hard metal alloy such as tungsten carbide. By means of the tool holder 11 the tool bit 12 is firmly supported in a position which is adjustable longitudinally to compensate for wear on the bit 12.

The tool holder 11 includes an elongated bar or supporting member 13 having a shank 14 of rectangular cross section adapted to be mounted in the tool post of a machine such as a planer. At the outer end of the supporting member 13 is a tool receiving recess 16 having a bit supporting lower face 18, an end face 20, and a bit supporting side face 22, the faces 18, 20 and 22 being generally perpendicular to one another. In this case the lower face 18 is inclined both longitudinally and laterally of the supporting member 13.

The recess 16 is adapted to receive the tool bit 12, together with a plate or shim 24 which in this case is interposed between the lower face 18 of the recess and the tool bit 12. The shim 24 may be secured to the supporting member 13 by some suitable means such as a flat headed machine screw 26. The tool bit 12 is provided with a suitable cutting edge 28 which in this case extends at an angle to the longitudinal axis of the supporting member 13. The tool bit 12, the shim 24, and the supporting member 13 are provided with suitable oblique surfaces 30, 31, and 32 which are formed to provide clearance for the cutting edge 28, the surfaces 31—32 being generally in alinement with one another.

In this instance the recess 16 in the supporting member 13 has a width which is less than the full width of the member 13, and the remaining portion of the member 13 forms a retaining wall 34. The tool bit 12 has a lower surface 36 and a lateral surface 38 which are adapted respectively to seat against the shim 24 and the side wall 22 of the recess 16.

A hold-down clamp or plate 40 is provided for clamping the tool bit 12 against the shim 24 and the side face 22 of the recess 16. The hold-down clamp 40 is preferably positioned in a recess 42 formed in the upper portion of the retaining wall 34, the recess being provided with a lower face 44 which is generally parallel to the lower face 18 of the recess 16. On its underside, the hold-down clamp 40 has a laterally inclined longitudinal clamping surface 46 which is adapted to engage with a longitudinal dovetail notch 48 in the adjacent upper edge of the tool bit 12, the notch 48 being provided with a laterally inclined lower surface 50 forming an acute angle with the side face 38 of the tool bit 12. The hold-down clamp 40 is secured to the supporting member 13 by means of a suitable machine screw 52 which extends through an aperture 54 in the hold-down clamp and is threaded into the retaining wall 34.

Provision is made for backing up the tool bit 12 to prevent it from shifting longitudinally under a cutting load. For this purpose the bar 13 is provided with back-up means 56 including a tool backing member in the form of a wedge shaped plate 58. The member 13 has a substantially smooth upper supporting surface 60 situated behind the recess 16, and the back-up plate 58 has a lower substantially smooth elongated wedge surface 62 adapted to seat against the surface 60. The tool bit 12 has a rear abutment or thrust transmitting face 64, and the back-up plate 58 has a front face 66 adapted to abut against the rear face 64. The back-up plate 58 is provided with a substantially smooth elongated upper wedge surface 68 inclined downward away from the front face 66 so that the back-up plate 58 tapers away from the tool bit 12. The back-up plate 58 is secured to the supporting member 13 by a machine screw 70 which extends through a longitudinal slot 72 in the back-up plate 58 and is threaded into the member 13, the screw 70 being provided with a head 71 for clampingly engaging the surface 68. As shown, the screw 70 extends perpendicularly to the upper wedge surface 68 so that the head 71 of the screw 70 will squarely engage the surface 68. With respect to the supporting surface 60, the screw 70 makes an acute angle.

When the illustrative tool holder of Figs. 1-5 is to be used, the tool bit 12 is placed in the recess 16 on top of the shim 24 and under the hold-down clamp 40. The clamping screw 52 is tightened down so that the hold-down clamp 40 holds the tool bit 12 against the shim 24 and the retaining wall 34, the tool bit 12 being held against the retaining wall 34 by virtue of the lateral inclination of the lower surface 50 of the longitudinal notch 48 in the tool bit 12. The wedge-shaped back-up plate 58 is moved forward until its front surface 66 abuts against the rear surface 64 of the tool bit 12. The back-up plate 58 can be swiveled on the screw 70 to provide full bearing contact between the plate 58 and the tool bit 12, even though the plate 58 and the bit 12 may not be absolutely square. The clamping screw 70 is then tightened down to hold the back-up member 58 against the upper surface 60 of the bar 13.

When a longitudinal cutting load is applied to the tool bit 12, the tool backing means 56 prevents rearward shifting of the tool bit 12. The tool backing member 58 is held fast against rearward shifting by wedging action between the head 71 of the clamping screw 70 and the upper surface 60 of the supporting bar or member 13. Any tendency toward rearward shifting merely increases the intensity of the wedging forces between the clamping screw 70 and the back-up member 58 so that the resistance to the rearward shifting is correspondingly increased. The wedging action between the back-up member 58 and the adjusting screw 70 provides a great frictional resistance to rotation of the clamping screw 70 and thereby prevents the screw 70 from becoming loosened accidentally.

After a period of use, it may become desirable to adjust the longitudinal position of the tool bit 12. Such longitudinal adjustment is occasioned by regrinding of the bit 12 for example. When the tool bit 12 is to be adjusted, the clamping screws 52 and 70 are unscrewed somewhat to loosen the hold-down clamp 40 and the back-up member 58. The tool bit 12 is adjusted to the desired position and then the clamping screw 52 is screwed down to tighten the hold-down clamp 40. The back-up member 58 is moved forward until its front face 66 abuts against the tool bit 12. Tool bits having widely different lengths can be accommodated because the slot 54 in the back-up member 58 provides a considerable range of longitudinal adjustment. The back-up member 58 is clamped in place by tightening the clamping screw 70. Because of the wedging action between the clamping screw 70 and the back-up member 58, the latter can be clamped in place in any position within the range of longitudinal movement provided by the slot 54.

The improved tool holder is unusually inexpensive to manufacture. The back-up arrangement is particularly noteworthy in this respect.

The second illustrative embodiment of Figs. 6-10 is similar in most respects to the first illustrative embodiment of Figs. 1-5, and most of the components of the second embodiment have been given the same reference characters as applied to the corresponding components of the first embodiment, with the addition of a prime suffix.

In Figs. 6-10 a tool holder 11' is shown, including a supporting bar or member 13' having a shank 14' and an enlarged head 19 provided with a tool receiving recess 16'. The recess 16' has lower, rear, and side walls 18', 20' and 22' respectively, and in this instance the side wall 22' extends at an angle to the longitudinal axis of the bar 13'. A shim 24' is secured to the lower surface 18' of the recess 16' by means of a machine screw 26', in order to position the tool bit 12' at the desired elevation. The tool bit 12' has a suitable cutting edge 28', and the tool bit 12', the shim 24', and the bar 13' are provided with suitable surfaces 30', 31' and 32' to provide clearance for the cutting edge 28'.

The supporting bar or member 13' has a lateral retaining portion 34' bounded by the side surface 22' of the recess 16'. In this instance a shim 80 is seated against the side surface 22' of the recess 16' and is secured to the bar 13' by suitable means such as a machine screw 82. The tool bit 12' has a lower surface 36' adapted to engage with the shim 24', and a lateral surface 38' adapted to engage with the shim 80.

The tool bit 12' is clamped in place in the recess 16' by means of hold-down clamp 40' positioned in a recess 42' formed in step-like manner above the recess 16' in the bar 13'. The recess 42' has a lower surface 44' which is generally parallel with the lower surface 18' of the recess 16'. The hold-down clamp 40' has a concave arch-like lower surface 84 including a laterally inclined longitudinal edge portion 46' which is adapted to engage with a longitudinal dovetail notch 48' in the tool bit 12'. The notch 48' has a laterally inclined lower surface 50' to retain the tool bit 12' in the recess 16'. A clamping screw 52' is provided for securing the hold-down clamp 40' to the bar 13'. The clamping screw 52' extends through an aperture 54' in the hold-down clamp 40' and is threaded into the lateral retaining portion 34' of the bar 13'.

The illustrative tool holder of Figs. 6–10 includes tool backing means 56' comprising a wedge-shaped back-up member 58'. In this instance the back-up member 58' is seated in a recess 86 formed in step-like fashion to the rear of the recess 16' and having a lower surface 60' to support the back-up member 58'. The back-up member 58' has a lower surface 62' engageable with the lower surface 65' of the recess 86. The tool bit 12' and the back-up member 58' have interengageable end surfaces 64' and 66' respectively. The back-up member 58' has a longitudinally inclined upper surface 68' so that the back-up member 58' tapers away from the end surface 66'. A clamping screw 70' extends through a longitudinal slot 72' in the back-up member 58' and is threaded into the bar 13', the screw being provided with a head 71' for clampingly engaging the upper surface 68' of the back-up member 58'.

The operation of the embodiment in Figs. 6–10 is similar to that of the embodiment of Figs. 1–5. The wedge-shaped back-up member 58' prevents longitudinal rearward shifting of the tool bit 12', even when a heavy cutting load is applied to the tool bit 12'. The wedging action of the back-up member 58' between the head 71' of the clamping screw 70' and the supporting bar 13' prevents retrograde movement of the back-up member 58' and accidental loosening of the clamping screw 70'. The wedging member 58' may be adjusted to any position within the range of longitudinal movement provided for by the slot 72'.

Infinitely fine adjustment of the back-up wedge member is possible because the wedging surfaces are smooth and unbroken. For carbide tool bits, this extremely fine adjustment is highly advantageous, because the brittleness of carbide bits requires that they be fully supported by the bit holder. Consequently, the bits should be set flush with the end of the holder, without any overhang. Moreover, the infinitely fine adjustability provided by this invention minimizes the amount of grinding required to sharpen the carbide bits, which are difficult to grind.

I claim as my invention:

1. In a cutting tool, the combination comprising a supporting member, a tool bit slidably mounted on said member for adjustment in a predetermined direction, means for releasably holding said bit on said member, said means including a backing member slidably mounted on said supporting member for adjustment substantially in said predetermined direction for engaging one end of said tool bit, said backing member having a pair of elongated substantially smooth relatively inclined wedge surfaces defining wedge means tapering away from said tool bit in said predetermined direction, and clamping means engaging one of said wedge surfaces for clamping the other of said wedge surfaces against said supporting member, said backing member thereby being wedged between said clamping means and said supporting member so as to effectively back up said bit against movement in said predetermined direction.

2. In a holder for a tool bit having a forwardly disposed cutting edge and a rearwardly disposed thrust transmitting surface, the combination comprising a supporting member having supporting means for slidably receiving the bit for forward and rearward adjustment to advance and retract the cutting edge, a backing member slidably mounted on said supporting member rearwardly of said supporting means for forward and rearward adjustment to engage the thrust transmitting surface and back up the bit, said backing member having a pair of elongated substantially smooth wedge surfaces defining a wedge portion tapering rearwardly away from said supporting means, one of said wedge surfaces being slidably engaged with said supporting member, and a clamping member engaging the other of said wedge surfaces for clamping said backing member against said supporting member, said backing member thereby being wedged between said clamping member and said supporting member so as to effectively back up said backing member against rearward movement.

3. In a cutting tool, the combination comprising a cutter bit having an undersurface, said bit having a cutting edge at its front end and a thrust transmitting surface at its rear end extending transversely to said undersurface, a supporting member having a supporting surface for adjustably engaging said undersurface, said bit being adjustable forwardly and rearwardly along said supporting surface, means for releasably holding said bit on said supporting member, said means including a wedge backing member having a front end portion for engaging said thrust transmitting surface on said bit, said wedge member having a pair of elongated substantially smooth, relatively inclined wedge surfaces converging gradually toward each other in a direction rearwardly of said bit, said wedge surfaces being generally parallel to said undersurface of said bit, said supporting member having a smooth surface disposed rearwardly of said bit for slidably supporting one of said wedge surfaces, and a clamping member for engaging the other of said wedge surfaces and clamping said wedge member against said smooth surface on said supporting member, said wedge member thereby being wedged between said clamping member and said smooth surface so that said wedge member will be immovable rearwardly under thrust-loading imposed by said bit during cutting operations.

4. In a cutting tool, the combination comprising a cutter bit having an undersurface, a cutting edge at its front end, and a thrust transmitting surface at its rear end extending transversely to said undersurface; a supporting member having a supporting surface for slidably engaging said undersurface, said bit being adjustable forwardly and rearwardly along said supporting surface; means for holding said bit immovably on said supporting member, said means including a wedge backing member having a front end portion for engaging said thrust transmitting surface and a pair of elongated substantially smooth relatively inclined wedge surfaces converging gradually toward each other in a direction rearwardly of said front end portion; said supporting member having a substantially smooth surface disposed rearwardly of said bit supporting surface and generally parallel thereto for slidably supporting one of said wedge surfaces; said wedge member having a slot extending there-through transversely to said wedge surfaces, said slot being elongated in a front-to-rear direction with respect to said bit; and a headed clamping screw extending through said slot and perpendicular to the other of said wedge surfaces for engaging said other of said wedge surfaces and clamping said wedge member against said smooth surface on said supporting member, said screw being threaded into said supporting member and disposed at an acute angle to said smooth surface, said wedge member thereby being wedged between said headed screw and said smooth surface so that said wedge member will be immovable rearwardly under the thrust imposed by said bit during cutting operations.

5. In a holder for a tool bit having a cutting edge at one end and an abutment surface at its opposite end, the combination comprising a supporting member having a surface for supporting said bit for forward and rearward adjustment therealong, means for releasably holding said bit immovably on said supporting member, said means including a wedge backing member having a front end portion for engaging said abutment surface on the bit, said wedge member having a pair of elongated substantially smooth relatively inclined wedge surfaces converging gradually toward each other in a direction rearwardly of said front end portion, said supporting member having a substantially smooth surface disposed rearwardly of said supporting surface and generally parallel thereto for slidably supporting one of said wedge surfaces, and a clamping member for engaging the other of said wedge surfaces and clamping said wedge members against said smooth surface on said supporting member, said wedge member thereby being wedged between said clamping member and said smooth surface so that said wedge member will be immovable rearwardly under the thrust imposed by said bit during cutting operations.

References Cited in the file of this patent

UNITED STATES PATENTS

| Number | Name | Date |
| --- | --- | --- |
| 1,380,744 | Simmons | June 7, 1921 |
| 1,970,016 | Morton | Aug. 14, 1934 |
| 2,449,823 | Sheridan | Sept. 21, 1948 |
| 2,450,365 | Thompson et al. | Sept. 28, 1948 |
| 2,537,837 | Labrozzi et al. | Jan. 9, 1951 |